United States Patent Office.

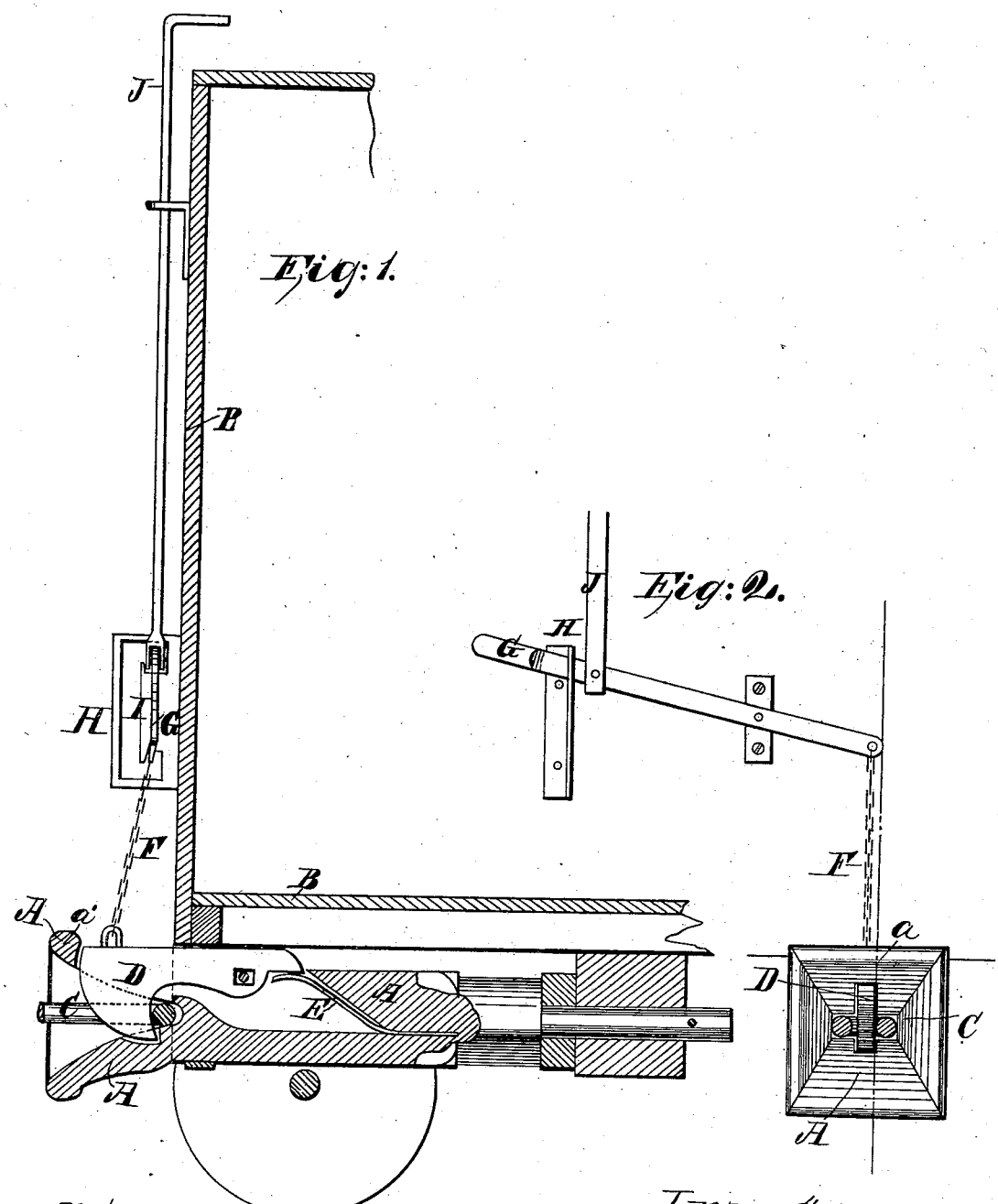

MANUEL VAN SLYKE AND D. W. WOOD, OF ROME, NEW YORK.

Letters Patent No. 96,514, dated November 2, 1869.

---

IMPROVED CAR-COUPLING.

---

The Schedule referred to in these Letters Patent and making part of the same.

---

*To all whom it may concern:*

Be it known that we, MANUEL VAN SLYKE and D. W. WOOD, of Rome, in the county of Oneida, and State of New York, have invented a new and useful Improvement in Car-Coupling; and we do hereby declare that the following is a full, clear, and exact description thereof, which will enable others skilled in the art to make and use the same, reference being had to the accompanying drawings, forming part of this specification.

Figure 1 is a detail sectional view of our improved car-coupling, as attached to a box or freight-car.

Figure 2 is a front view of the same.

Our invention has for its object an improvement in car-couplings; and

It consists in the construction and combination of parts, as hereinafter more fully described.

A is the bumper-head, which may be secured to the car B, in the ordinary manner.

The mouth of the bumper-head A is made bell or hopper-shaped, to guide the coupling-link C into proper position in the coupling-box.

D is the coupling-hook, which is placed in a slot in the upper side of the bumper-head A, and is pivoted to said bumper-head by a pin or bolt passing horizontally through holes in the sides of the bumper-head A, and through a short slot or oblong hole in the hook D, so that when the draught is applied draught-strain may be supported by the solid part a' of the upper side of the bumper-head.

The upper part of the forward edge of the hook D is bevelled off, and also the part a' of the bumper-head A, against which it rests in such a way that the tendency of the draught-strain may be to force the hook downward.

The point of the hook D enters a shallow recess formed in the bottom or lower side of the mouth of the bumper-head A, and the forward edge of said hook is bevelled or rounded off, so that the entering-link C, when the cars are run together, may raise the said hook, and pass into the coupling-box.

The shoulder of the hook D that the link C rests against, in sustaining the draught-strain, is inclined or curved, so that the tendency of the draught-strain may be to draw the hook downward, and thus hold it securely in place.

The rear end of the hook D extends in the rear of the pivoting-pin or bolt, and in a recess in the bumper-head beneath; and beyond the said rear end of the hook D, is placed a spring, F, the free end of which presses upward against the under side of the projecting rear end of the hook D, to hold said hook securely in place and prevent the said hook from being raised by a sudden jolt or jar, and thus uncouple the cars accidentally.

The spring E should be covered by a projecting part or partition of the bumper-head, to protect it from accidental injury.

To the upper part of the forward end of the hook D is attached the lower end of the short chain F, the upper end of which is attached to the inner end of the lever G, which is pivoted to the body or platform of the car, and its outer end extends out into such a position that it may be conveniently reached and operated from the side of the car for uncoupling the cars.

The outer part of the lever G passes through a keeper H attached to the body or platform of the car, and which is formed, or with which is connected, a double catch, I, to hold the lever G, both when the hook D is down and when it is desired to hold the said hook raised.

J is a lever, the lower end of which is pivoted to the outer part of the lever G, and which extends up into such a position that it may be reached and operated to uncouple the cars from the top of the car.

The lever J passes up through an eye-bolt or keeper, attached to the car, to keep the said lever in proper position, and which serves also as a fulcrum to enable the lever G to be detached from the catch I by means of the said lever J.

Having thus described our invention,

We claim as new, and desire to secure by Letters Patent—

The combination of the double catch I, with the bar J and lever G, whereby the coupling-hook D may be held in an elevated position, or its undue elevation by combined weight of said bar and lever be prevented, all constructed as hereinbefore shown and described.

M. VAN SLYKE.
D. W. WOOD.

Witnesses:
HENRY HAGER,
GEORGE DICKERSON.